(12) United States Patent
Wallestad

(10) Patent No.: US 6,578,855 B2
(45) Date of Patent: Jun. 17, 2003

(54) VEHICLE SUSPENSION CONTROL SYSTEM

(75) Inventor: Steven Daniel Wallestad, Cedar Falls, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 09/903,172

(22) Filed: Jul. 11, 2001

(65) Prior Publication Data

US 2003/0011162 A1 Jan. 16, 2003

(51) Int. Cl.[7] .............................................. B60G 17/00
(52) U.S. Cl. ............................ 280/6.157; 280/124.159
(58) Field of Search ........................... 280/6.157, 6.159, 280/6.16, 124.158, 124.159, 124.16, 124.161

(56) References Cited

U.S. PATENT DOCUMENTS 5,299,488 A * 4/1994 Kadlicko et al. ...... 280/124.161
5,338,010 A * 8/1994 Haupt .................. 280/124.158
6,145,859 A * 11/2000 Altherr et al. ........ 280/124.159

FOREIGN PATENT DOCUMENTS

DE       42 42 448 C1    3/1994
DE       197 19 075 A1   11/1998
JP       1-160717    *   6/1989    ............. 280/6.158

* cited by examiner

Primary Examiner—Peter C. English

(57) ABSTRACT

A vehicle suspension system includes a fluid pump, a pair of suspension cylinders and a hydraulic control circuit for controlling pressurization of the suspension cylinders. Each suspension cylinder has a head end and a rod end. The control circuit includes a proportional rod pressure control valve with a first pilot which is exposed to a pressure which is communicated to the head end of the suspension cylinder, and a second pilot which is exposed to pressure which is communicated to the rod end of the suspension cylinder. The rod pressure control valve controls pressure in the rod end of the suspension cylinder as a function of and proportional to the pressure in the head end of the suspension cylinder. A suspension damping valve controls communication between a chamber of the cylinder and an accumulator.

15 Claims, 1 Drawing Sheet

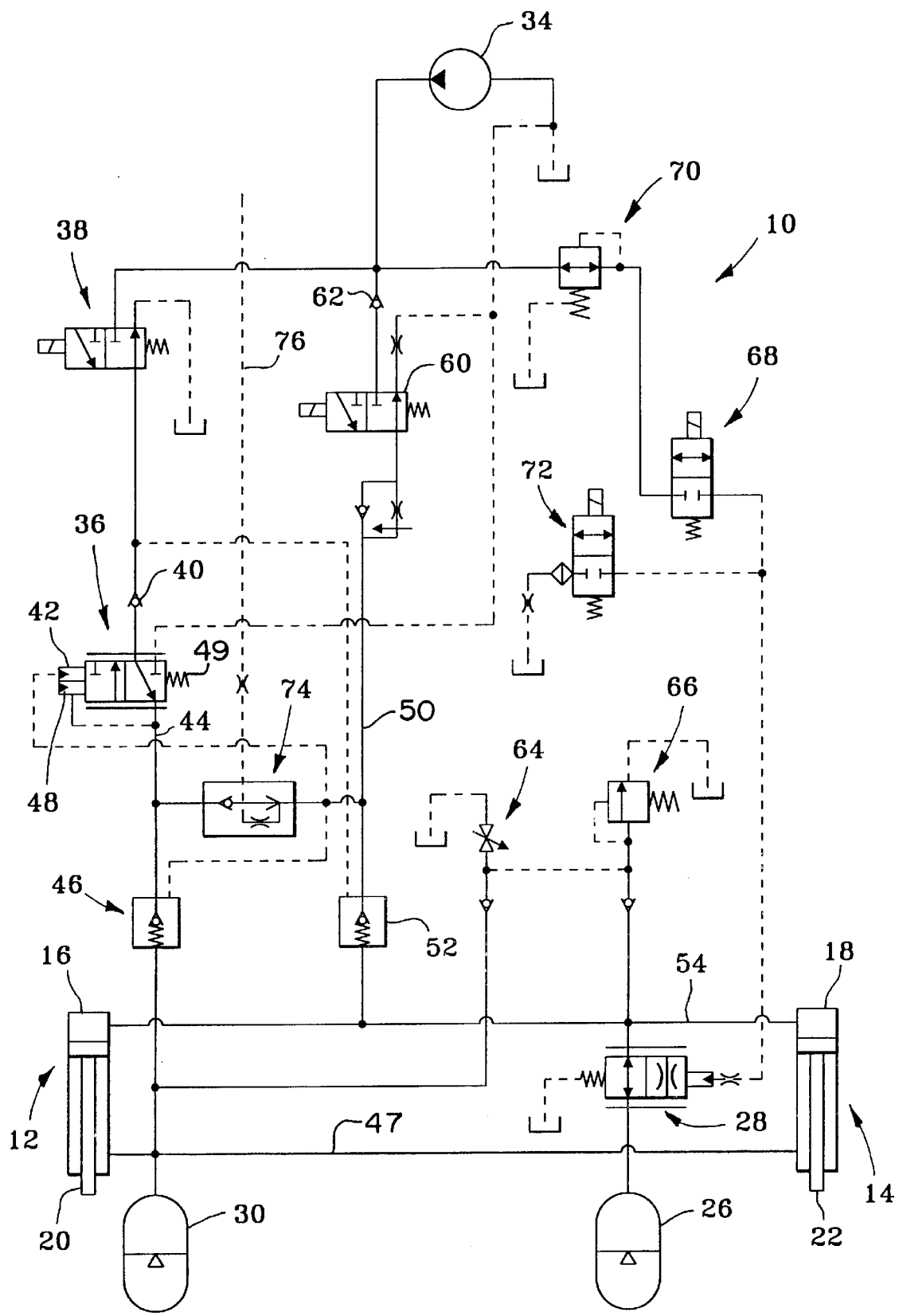

VEHICLE SUSPENSION CONTROL SYSTEM

BACKGROUND OF THE INVENTION

The present invention relates to a suspension system for a vehicle, such as a heavy duty tractor.

Heavy duty tractors have been provided with front axle hydraulic suspension systems which include a pair of hydraulic cylinders connected between the frame and the axle of the tractor. One such system is described in German patent number DE 4242448, published Mar. 31, 1994. Such suspension systems also include hydraulic accumulators and can perform a chassis leveling function. Such tractors are subject to a wide range of axle loads, and these loads can exceed the normal pressure range of the accumulator. If an implement is attached to such a tractor, implement operation can produce large changes in load and chassis attitude which can interfere with implement control and with chassis attitude control. Leveling response time can be slow because flow to both the head and rod ends of the cylinders must be controlled by a pair of solenoid operated valves.

Such systems use a fixed pressure regulator to control rod side pressure or uses a common head and rod pressure. To achieve the maximum load range it is desirable to have a high rod pressure when the head pressure is low and a low rod pressure when the head pressure is high. To maintain level tractor attitude and better implement control it is desirable to restrict vertical chassis displacement when significant changes are anticipated. It is not desirable to block flow on both sides due to the potential to work head and rod against each other due to flow into the cylinder or thermal effects.

Such prior systems also do not allow for independent rod and head charging. As a result, flow typically goes to the rod side first, which is the path of least resistance. This results in delayed leveling operation, and results in the discharge of rod side oil that was just introduced into the rod side, thus wasting energy.

SUMMARY

Accordingly, an object of this invention is to provide a hydraulic suspension control system which can accommodate a wide range of loads.

A further object of the invention is to provide such a system which avoids delayed leveling operation.

A further object of the invention is to provide such a system which does not waste energy by discharging rod side oil.

A further object of the invention is to provide such a system which maintains level tractor attitude and which improves implement control.

These and other objects are achieved by the present invention, wherein a hydraulic control circuit is provided for a vehicle suspension system having a fluid pump and suspension cylinders, each having a head end and a rod end. The control circuit includes a proportional rod pressure control valve with a pair of pilots. The first pilot is exposed to a pressure which is communicated to the rod end of the suspension cylinder. The second pilot is exposed to pressure which is communicated to the head end of the suspension cylinder. The rod pressure control valve controls pressure in the rod end of the suspension cylinder as a function of and proportional to the pressure in the head end of the suspension cylinder. System pressure is communicated to the rod pressure control valve via a solenoid operated raise/lower valve. In order to achieve the maximum load range, the system produces a high rod pressure when the head pressure is low and produces a low rod pressure when the head pressure is high.

Vertical chassis displacement is restricted to maintain level tractor attitude and provide better implement control by restricting flow between the cylinders and accumulator on one side of the suspension. Pilot pressure is applied to the damping valve rapidly to respond quickly to load changes. Flow between the cylinders and accumulator may be restricted or completely blocked. This results in a significant pressure differential between the cylinders and the accumulator. To control pressure equalization, pilot pressure is metered off across an orifice. The metering opens the damping valve slow enough so that the controller may respond to position changes by leveling, closing the pilot exhaust valve to hold the damping valve in position or reapplying pilot pressure to start the opening process again.

As an alternative to completely blocking flow between cylinders and accumulators, it is desirable to orifice flow between cylinders and accumulators. Gradual pressure equalization can easily be made up by leveling flow. When pressure is partially or completely taken care of by the equalization orifice, control requirements are simplified and the transition from damped to undamped operation is quick and seamless. The equalization orifice also improves safety by insuring that the cylinders and accumulators can be drained by the same elements, and insures equalization if the tractor is shut off while the suspension is in damped condition, thus avoiding unexpected motion if the damping valve opens at a later time.

The head and rod ends may be independently charged in order to achieve prompt leveling operation, and in order to avoid the discharge of rod side oil, thus saving energy. Flow can be applied to the head side first to accomplish a portion of the leveling before flow/pressure is applied to the rod side to set the rod side pressure. For this purpose, the head and rod side of the system are cross piloted.

BRIEF DESCRIPTION OF THE DRAWINGS

The sole FIGURE is a hydraulic circuit diagram of a vehicle hydraulic suspension system according to the present invention.

DETAILED DESCRIPTION

The FIGURE shows a vehicle suspension system 10, such as for a front axle (not shown) of a tractor (not shown), which includes a pair of suspension cylinders 12, 14, each having a housing 16, 18 coupled to a frame (not shown) of the vehicle and a rod 20, 22 coupled to a front axle part (not shown), such as a front axle lower arm (not shown). The head chambers of cylinders 12, 14 are connected to accumulator 26 via a pilot operated suspension damping valve 28. The rod chambers of cylinders 12, 14 are connected to accumulator 30.

System pressure from pump 34 is supplied to proportional rod pressure control valve 36 via solenoid operated raise/lower valve 38 and rod side anti-craning check valve 40. Valve 36 includes a first pilot 42 which is exposed to the pressure which is communicated to the head chambers of the cylinders 12 and 14 via line 50, head side pilot operated check valve 52, and line 54. Valve 36 includes a second pilot 48 which is exposed to the pressure which is communicated to the rod chambers of the cylinders 12 and 14 via line 44, rod side pilot operated check valve 46 and line 47. Pilots 42 and 48 operate together against a spring 49. As a result, tare pressure in the rod chambers of cylinders 12, 14 is controlled as a function of and is proportional to the pressure in the head chambers of cylinders 12, 14.

System 10 includes a solenoid operated raise valve 60 which can be activated to communicate system pressure from pump 34 via check valve 62 to the head chambers of cylinders 12, 14 via check valve 52 and line 54. A manually operated drain valve 64 can be operated to communicate the rod and head chambers of cylinders 12,14 to sump. Pressure relief valve 66 relieves or limits pressure in the rod and head chambers of cylinders 12, 14 by communicating the same to sump if the pressure in the chambers of cylinders 12, 14 exceeds a certain level.

A solenoid operated lock valve 68 controls communication of pressure from pump 34 and pressure reducing valve 70 to the pilot of pilot operated suspension damping valve 28. Thus, when valve 68 is activated the pilot of valve 28 is pressurized and valve 28 restricts communication between the head chambers of cylinders 12, 14 and accumulator 26, thus holding constant the amount of fluid in the head chambers of cylinders 12, 14. This restricts vertical chassis displacement and helps to maintain level tractor attitude and provide better control of an implement (not shown) which may be attached to the tractor (not shown).

A solenoid operated unlock valve 72 controls communication of pressure between sump and the pilot of pilot operated suspension damping valve 28. Thus, when valve 72 is activated the pilot of suspension damping valve 28 is de-pressurized and valve 28 opens communication between the head chambers of cylinders 12, 14 and accumulator 26, thus allowing the amount of fluid in the head chambers of cylinders 12, 14 to vary.

The lock function is rapid in order to respond to changes in implement loads. Unlocking is controlled so that pressure differences between head and rod chambers can be adjusted. The system 10 meters flow between the cylinders and the accumulator 26 during a portion of the stroke of the damping valve 28, and then opens fully for minimum restriction of flow between the cylinders and the accumulator 26 during unlocked operation. The system 10 is also bi-stable so no change of state occurs in the event of electric or hydraulic power loss.

A shuttle check valve 74 with load sense bleed communicates pressure from the outlet of rod pressure control valve 36 to a load sense line 76, and the supply side of the head side of the pilot operated check valve 52.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A hydraulic control circuit for a vehicle suspension system having a fluid pump and a suspension cylinder having a head chamber and a rod chamber, the control circuit comprising:

an accumulator connected to the rod chamber; and a proportional rod pressure control valve having a first pilot which is exposed to a pressure which is communicated to the head chamber of the suspension cylinder, and a second pilot which is exposed to pressure which is communicated to the rod chamber of the suspension cylinder, the first and second pilots operating together against a spring, the rod pressure control valve controlling pressure in the accumulator and the rod chamber of the suspension cylinder as a function of and proportional to the pressure in the head chamber of the suspension cylinder.

2. The control circuit of claim 1, further comprising:

a solenoid operated raise/lower valve which controls communication of system pressure to the rod pressure control valve.

3. The control circuit of claim 2, wherein:

the raise/lower valve is solenoid operated.

4. The control circuit of claim 1, further comprising:

a solenoid operated raise valve which can be activated to communicate system pressure from the pump to the head chamber via a check valve.

5. The control circuit of claim 1, further comprising:

a manually operated drain valve which can be operated to communicate the rod and head chambers to sump.

6. The control circuit of claim 1, further comprising:

a pressure relief valve which limits pressure in the rod and head chambers by communicating the rod and head chambers to sump if the pressure in the chambers exceeds a certain level.

7. The control circuit of claim 1, further comprising:

a further accumulator coupled to the head chamber; and a suspension damping valve for controlling communication between the head chamber of the cylinder and the further accumulator.

8. The control circuit of claim 1, further comprising:

a further accumulator coupled to the head chamber;

a pilot operated suspension damping valve for controlling communication between the head chamber of the cylinder and the further accumulator; and a lock valve for controlling communication between the pump and a pilot of the suspension damping valve.

9. A vehicle suspension system coupled between a frame and axle of the vehicle, comprising:

a fluid pump;

a suspension cylinder coupled between the frame and the axle, the cylinder having a first chamber and a second chamber;

an accumulator connected to the second chamber; and a control circuit for controlling fluid communication between the pump and the cylinder, the control circuit comprising a proportional rod pressure control valve having a first pilot which is exposed to a pressure which is communicated to the first chamber of the suspension cylinder, and a second pilot which is exposed to pressure which is communicated to the second chamber of the suspension cylinder, the first and second pilots operating together against a spring, the rod pressure control valve controlling pressure in the accumulator and the second chamber of the suspension cylinder as a function of and proportional to the pressure in the first chamber of the suspension cylinder.

10. The vehicle suspension system of claim 9, further comprising:

a solenoid operated raise/lower valve which controls communication of system pressure between the pump and the rod pressure control valve.

11. The vehicle suspension system of claim 10, wherein:

the raise/lower valve is a solenoid operated valve.

12. The vehicle suspension system of claim 9, further comprising:

a solenoid operated raise valve which can be activated to communicate system pressure from the pump to the first chamber of the cylinder via a check valve.

13. The vehicle suspension system of claim 9, further comprising:

a manually operated drain valve which can be operated to communicate the second chamber of the cylinder to sump.

14. The vehicle suspension system of claim 9, further comprising:

a pressure relief valve which limits pressure in the first chamber of the cylinder by communicating the first chamber to sump if the pressure in the first chamber exceeds a certain level.

15. The vehicle suspension system of claim 9, further comprising:

a further accumulator coupled to the first chamber; and a suspension damping valve for controlling communication between the first chamber of the cylinder and the further accumulator.

\* \* \* \* \*